United States Patent [19]

Iijima et al.

[11] 4,040,937
[45] Aug. 9, 1977

[54] MOTHER BLANK FOR PRODUCING STARTING SHEETS USED IN ELECTROLYTIC NON-FERROUS METAL PRODUCTION

[75] Inventors: Ryozo Iijima, Osaka; Yukio Matsubara, Iwaki; Ginichi Yamaguchi, Iwaki; Masatoshi Fukushima, Iwaki, all of Japan

[73] Assignees: Ryozo Iijima, Osaka; Onahama Seiren Kabushiki Kaisha, Tokyo, both of Japan

[21] Appl. No.: 645,289

[22] Filed: Dec. 29, 1975

[30] Foreign Application Priority Data

Dec. 28, 1974    Japan ........................ 50-3518

[51] Int. Cl.² .................. C25B 11/00; C25C 7/02
[52] U.S. Cl. .............................. 204/281; 204/12
[58] Field of Search ............. 204/12, 13, 281, 290 R

[56] References Cited

U.S. PATENT DOCUMENTS

| 3,385,780 | 5/1968 | Feng .............................. 204/290 R |
| 3,397,125 | 8/1968 | Tapley ................................. 204/12 |
| 3,798,151 | 3/1974 | Takamura et al. .................. 204/281 |
| 3,804,724 | 4/1974 | Bolger et al. ....................... 204/281 |
| 3,830,710 | 8/1974 | Narozanski et al. ................ 204/281 |

*Primary Examiner*—T. Tung
*Attorney, Agent, or Firm*—Wenderoth, Lind & Ponack

[57] ABSTRACT

A mother blank for producing starting sheets used in electrolytic non-ferrous metal production, is composed of a laminar electrolytic deposition member comprising a planar metal member constituting the central layer of laminar deposition member, and electrically conductive polybutene resin layers constituting two surface layers of the laminar deposition member, and a frame-like member made of an electrically nonconductive polybutene resin and attached integrally to the periphery of the laminar deposition member.

11 Claims, 8 Drawing Figures

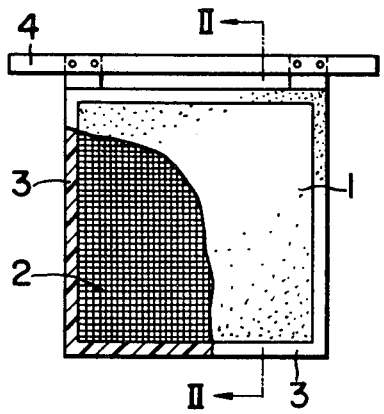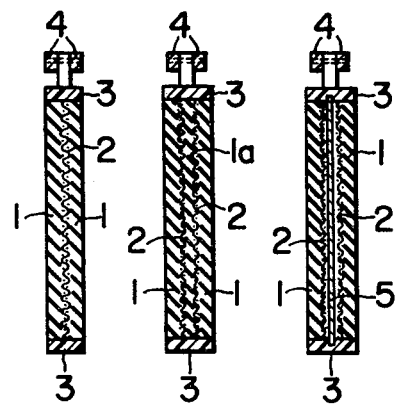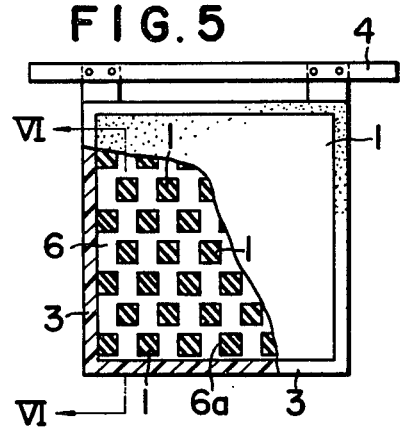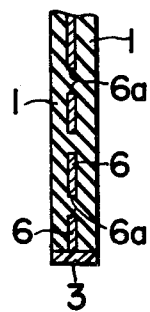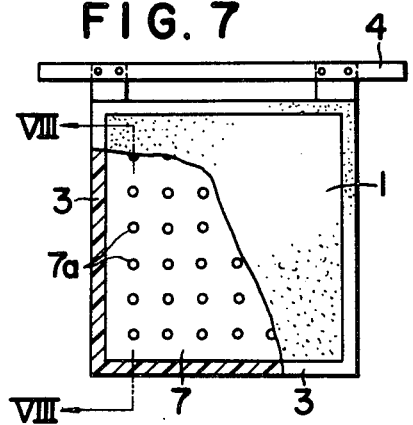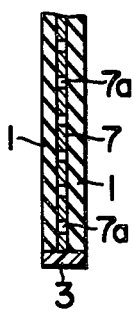

MOTHER BLANK FOR PRODUCING STARTING SHEETS USED IN ELECTROLYTIC NON-FERROUS METAL PRODUCTION

BACKGROUND OF THE INVENTION

This invention relates generally to electrolytic processes for production, inclusive of electrorefining and electrowinning, of a non-ferrous metal such as copper, zinc and the like, and more particularly to a mother blank which is used for producing cathode starting sheets on which the non-ferrous metal is electrolytically deposited.

In the case where a non-ferrous metal such as copper is electrolytically refined or won, a pure copper thin plate is ordinarily used as a cathode starting sheet, hereinafter referred to as a starting sheet, which is disposed in opposition to an anode made of, for instance, crude copper in an electrolyte of copper sulfate. Electrolysis is then carried out thereby to deposit copper on the starting sheet. The pure copper thin plate used as the cathode starting sheet is also ordinarily produced electrolytically by effecting the deposition for a short period of about 24 hours on a cathode and by peeling the deposited copper from the cathode. This cathode used for producing a starting sheet is hereinafter referred to as a mother blank.

Mother blanks of a conventional construction have generally been composed of a rolled copper plate, the peripheral regions thereof being covered with an insulating tape so that two separate depositing surfaces both having a required area, are defined on the front and rear surfaces of the rolled copper sheet.

The reason for covering the periphery with an insulating tape is as follows. When electrolysis is carried out with a cathode plate which is electrically conductive throughout the surfaces, since a metal forming a starting sheet is deposited all over the surfaces inclusive of the peripheral edges, it is difficult to effect the peeling thereof, and, even if it is possible, the resulting deposited sheet is liable to be in a bagshape and fail to give two separated starting sheets formed on each of the two surfaces of the cathode plate. For this reason, it is essential that the peripheral portion of the mother blank is provided with an insulating zone so that separate depositing surfaces are formed on both sides of the mother blank.

With the above described features in view, it is apparent that the deposition surfaces of a mother blank should have a good electrical conductivity and an appropriate cohesive nature with the metal deposited thereon at the time of the depositing operation, nevertheless appropriate extents of peelability and mechanical strength at the time of the peeling operation, thus facilitating the removal of the deposited metal from the deposition surfaces without damaging either of the deposited metal and deposition surfaces. Furthermore, the mother blank should have a high resistance to chemicals and mechanical stability under the deposition conditions.

Various proposals have been made for improving the peelability and other natures of the depositing surfaces, such as using a mother blank made of titanium, or sandwiching a planar metallic member between two non-metallic layers made electrically conductive by dispersing therein a conductive powdery substance, thereby obtaining a mother blank of a laminar structure.

However, such conventional mother blanks have been found to have the following difficulties and are not necessarily considered satisfactory.

Although a mother blank made of titanium exhibits appropriate peelability when the surface thereof is properly treated, the mother blank is not only uneconomical but is also accompanied by some problems in a peeling process subsequent to the deposition process. That is, the titanium made mother blank has been ordinarily provided with peripheral grooves for separating the depositing surfaces from each other, and considerable labor is required to remove the deposited metal remaining on the part outside the grooves from the latter, thus making it difficult to operate the peeling process in an automatic manner.

The use of the non-metallic material, which has been made electrically conductive as mentioned hereinbefore, as a mother blank is further accompanied with a number of difficulties. A rubbery material comprising butyl rubber or isoprene rubber with carbon powder or metal powder dispersed therein has microscopic pores which remain on the surface, and seize the metal deposited thereon making it difficult to peel the thus deposited metal from the rubber surface. Accordingly, such a rubbery material is unsuitable for practical use.

On the other hand, when an electrically conductive synthetic resin material obtained by imparting electro-conductivity to an ordinary synthetic resin, such as polyvinyl chloride, polyethylene, and polypropylene, is used in the mother blank, undesirable deformation or cracks tend to form on the mother blank when the mother blank is used repeatedly in the electrolyte of an ordinary electrolysis temperature (for example, of about 60° C) and cooled to room temperature. Furthermore, in some cases, due to the difference in thermal expansion coefficient of the plastic layers and the planar metallic layer sandwiched therebetween or the core material, all of which constitute the mother blank, adherence between these layers tends to be deteriorated, and the mother blank tends to become useless (as shown in the reference example).

If silicon rubber or Teflon is used in the mother blank as a resin material constituting the electrically conductive non-metallic layers, there is no problem in the peelability and the dimensional stability during use of the mother blank. However, the use of these materials is not economical in view of the high costs, and furthermore it is not practical because of their poor workability.

Thus, it is apparent that the conventional materials for producing the non-metallic layers of the mother blank still have a number of difficulties which must be overcome, regardless of such advantageous features as light weight and high chemical resistance.

Besides the peelability of the depositing surfaces of the mother blank, what matters is the durability of the insulating zone formed on the periphery of the depositing surfaces. The insulating zone is formed by application of an insulating tape, which is liable to be mechanically damaged while repeating the electrolytic deposition and peeling of the deposited metal, and cracks tend to form on part of the surfaces. Furthermore, the adhesive agent, when it is used, tends to deteriorate due to the permeation of the electrolyte, thereby resulting in the separation of the insulating tape from the deposition surfaces. For these reasons, the average operational life of the insulating tape is found to be approximately 40 times repetitions of the depositing and peeling operations, and thereafter the tape must be renewed. However, the renewal of the tape requires manual operations, such as peeling the worn tape, regrinding the deposition surfaces, and applying a new tape, which are difficult to be mechanized and require considerable amounts of labor and time, thus constituting a bottleneck in the electrolytic production or refining of non-ferrous metals for which numerous mother blanks are necessary.

SUMMARY OF THE INVENTION

A fundamental object of the present invention is to provide an electrolytic mother blank for producing starting sheets for non-ferrous metal production, which is excellent both in workability and durability represented by cohesiveness and peelability of a deposited metal, and thus can overcome all the above described difficulties in the conventional mother blanks.

After enthusiastic study about the operational conditions and the requirements for the mother blank, we have drawn the following conclusion.

For convenience, the mother blank of the present invention may be defined as a blank composed of an electrolytic deposition member which is a planar member comprising deposition surfaces on both sides thereof, and an insulating member attached to the periphery of the deposition member. We have found that there is a limitation on the repeated usage of the mother blank so far as the electrically conductive deposition member and the insulating member attached to the periphery thereof which is electrically nonconductive are made of different materials as in the conventional mother blanks; it is therefore the most advantageous for the elongation of the operational life that the above-described deposition member and insulating member are made of substantially the same material, and are combined integrally; and that a polybutene resin is most suitable for use as such a material, and by rendering electric conductivity to the polybutene resin, an electrically conductive material provided with all the properties required of an electrolytic deposition member inclusive of the peelability of a deposited metal can be obtained.

This invention is based on these findings, and provides a mother blank for electrolytic production or refining of a non-ferrous metal, which comprises a laminar electrolytic deposition member comprising a planar metal member as the central layer and electrically conductive polybutene resin layers constituting two surface layers of the electrolytic deposition member, and a frame-like insulating member made of an electrically nonconductive polybutene resin and attached integrally to the periphery of the laminar electrolytic deposition member.

The mother blank thus formed according to the present invention is excellent in both deposition and peelability of the non-ferrous metal, and further in durability. More particularly, the advantageous features of the mother blank according to this invention are set forth as follows:

1. Since the laminar deposition member and the insulating member are both made of substantially the same material, i.e., polybutene resin, and integrally combined with each other, the adhesive strength between these members can be elevated as high as 250 kg/cm², and any possibility of these two members being separated while the mother blank is transported from the depositing vessel to the peeling process, or during the peeling of the deposited metal layer where the mother blank, is subjected to mechanical forces or mechanical shocks, can be substantially eliminated.

2. The electrically conductive polybutene resin exhibits characteristic features well adapted to the depositing member.

An electrically conductive polybutene resin consisting of, for example, polybutene-1 and carbon dispersed therein, for instance, in an amount of from 45 to 50% of the polybutene-I, has a specific resistance of 10 ± 5 Ω cm well adapted for this application. Furthermore, the thermal expansion coefficient of the resin is 1.25 which is substantially constant regardless of the temperature variation, and the softening point thereof is about 125° C suitable for use in an ordinary electrolyte of about 60° C.

In addition, the electrically conductive polybutene resin shows an appropriate adhesiveness to the thin layer of the deposited metal, thus eliminating any possibility of the deposited layer being peeled off the polybutene while the latter is transported from the electrolytic vessel to the peeling process, while the deposited metal sheet can readily be peeled off the polybutene resin, and substantially no contamination occurs either on the mother blank or on the thin sheet of metal thus peeled off the mother blank. The electrically conductive polybutene exhibits another advantageous feature of providing stable properties in the temperature range of from − 30° to + 100° C.

3. The polybutene resin, from which the electrolytic deposition member and the insulating member are made, is in itself excellent in resistivity against stress-cracking, and therefore is adapted to such an appplication where the resin is subjected to repeated stresses while contacting with various chemicals. In a test comparing the durations of the resin and other materials, a cycle comprising three-days heating with steam of 100° C and one-day cooling was repeated several times as required. It was found that the sample made of polyethylene began to crack after 48 hours of the aforementioned test, and the sample made of polypropylene began to crack after 1600 hours of the test. However, the sample made of polybutene showed no appreciable variation after 6000 hours of the duration test.

Since the polybutene is a thermoplastic material, advantageous features such as high workability and easiness in reclamation can be attained.

BRIEF DESCRIPTION OF THE DRAWINGS

FIG. 1 is a partly cut out front elevational view of an embodiment of the mother blank according to the present invention;

FIG. 2 is a cross-sectional view taken along the line II—II in FIG. 1 showing the laminar structure of the mother blank;

FIG. 3 is a cross-sectional view, similar to FIG. 2, showing a modification of an embodiment shown in FIG. 1;

FIG. 4 is another cross-sectional view similar to FIG. 2, showing another modification of the same embodiment;

FIG. 5 is a partly cut out front elevational view of another embodiment of this invention;

FIG. 6 is a cross-sectional view taken along the line VI—VI in FIG. 5;

FIG. 7 is a partly cut out front elevational view of still another embodiment of this invention; and FIG. 8 is a cross-sectional view taken along the line VIII—VIII in FIG. 7.

DETAILED DESCRIPTION OF THE INVENTION

The accompanying drawings illustrate several embodiments of the mother blank according to the present invention.

Referring to FIGS. 1 and 2, there is indicated a basic construction of the mother blank. FIG. 1 is a partly cut out front view of an embodiment of the mother blank according to the present invention, and FIG. 2 is a cross-sectional view taken along the line II—II in FIG. 1. As clearly shown in FIG. 2, the basic construction of the mother blank according to this invention comprises an electrolytic deposition member of a laminar structure comprising compositely two surface layers 1 made of an electrically conductive polybutene resin and a sheet of metal wire net 2 as a planar metal member interposed between the two surface layers, and a framelike insulating member 3 made of an electrically nonconductive polybutene resin attached integrally to the periphery of the electrolytic deposition member.

It should be noted that the integral structure herein referred to or the structure referred to in terms of "attached integrally to" defines a structure wherein the respective component parts, particularly the electrolytic deposition member and the insulating member, are melt-bonded together in an inseparable manner. The mother blank thus formed into an integral structure may be secured to a cross bar 4 and used for depositing nonferrous metal thereon.

It is advantageous that the sheet of metal wire net 2 constituting a planar metal member is extended throughout the entire area of the electrolytic deposition member. The planar metal member has functions to elevate electrical conductivity of the electrolytic deposition member and to present reinforcing and weight adjusting effects on the whole mother blank. More specifically, the polybutene resin has an advantageous feature of light weight but, in view of the specific gravity of about 1.25 of the electrolyte, the mother blank made of the polybutene resin is required to have an appropriate weight. For this reason, more than one planar weight member may be used in some specific cases. FIG. 3 shows an example of a mother blank having two metal wire nets wherein a layer 1a of electrically conductive polybutene resin is inserted between the two metal wire nets. Of course, a plurality of wire nets may be overlaid on each other. FIG. 4 is a cross-sectional view showing a mother blank wherein a reinforcing member 5 of a fiber-reinforced plastic and the like is interposed between the two metal wire nets thereby to enhance the reinforcing effect.

As for the planar metal member, a sheet of metal plate may also be used instead of a sheet of metal wire net. In this case, however, the adhesiveness between the metal and the polybutene resin is not sufficient, and therefore a plurality of perforations are preferably provided through the metal plate. Through these perforations, the electrically conductive polybutene resin on both sides of the metal plate can be united integrally thereby to improve the adhesiveness between the two components of the mother blank.

FIGS. 5, 6, 7, and 8 illustrate examples of a mother blank wherein such a perforated metal plate is used as a planar metal member. In the example shown in FIG. 5, a perforated metal plate 6 having a plurality of square holes 6a arranged checker-wise is used between the electrically conductive polybutene resin layers 1. FIG. 6 is a cross-sectional view thereof taken along the line VI—VI in FIG. 5. In another example shown in FIG. 7, round holes 7a, instead of the square holes 6a, are provided through a metal plate 7. FIG. 8 is a cross-sectional view thereof taken along the line VIII—VIII in FIG. 7. According to the present invention, the shape and the arrangement of the holes may be selected arbitrarily, and holes of triangular, oval or any other shapes or combinations thereof may also be utilized, if desired.

The materials of each part of the mother blank and the ways to assemble the mother blank will now be described in detail.

The electrolytic deposition member and the insulating member constituting the mother blank in combination may be made from essentially the same material, i.e., a polybutene resin. Herein, the term "polybutene resin" is intended to mean a resin containing polymerized butene-I units as its major part. More specifically, a resin herein referred to as a polybutene resin includes a homo-polymer of butene-I (polybutene-1), a copolymer of butene-I and an $\alpha$-olefin having carbon atoms of from 2 to 4 in an amount not exceeding 20% by weight of the butene-I, and a polymer mixture of polybutene-I and a polymer of $\alpha$-olefin having carbon atoms of from 2 to 4 in an amount not exceeding 20% by weight of the polybutene-1.

The polybutene resin is ordinarily of a crystalline nature, and for maintaining this nature, the amount of the aforementioned $\alpha$-olefin or polymer thereof to be added is preferably not exceeding 10%, and most preferably not exceeding 5% of the butene-I or polybutene-1. A most advantageous polybutene resin is the homo-polymer of butene-1.

The polybutene resin preferably has a melt index in the range of from 1.0 to 3.5, more preferably from 2.0 to 2.8, a softening temperature in the range of from 100° to 140° C, more preferably from 115° to 130° C, and a melting point in the range of from 120° to 180° C, more preferably 140° to 165° C.

The polybutene resin may be further added with additives usually employed in the art of resin processing, such as plasticizer, thermal stabilizer, pigment and the like, in amounts usually allowed for such additives, and the polybutene resin thus prepared may be used as an electrically nonconductive polybutene resin described hereinbefore.

For the preparation of the electrically conductive polybutene resin, an electrically conductive material such as metal or carbon, in powdery form, is dispersed in the polybutene resin described above. Carbon powder, particularly, electrically conductive carbon powder such as Conductex "950" furnished by Columbia Carbon Co. or XC-72 furnished by Cabot Co. is a material most suitable for the purpose of the present invention, and powder of a particle size less than 100 m$\mu$, preferably in the range of from 5 to 50 m$\mu$, is used therefor. The amount of the carbon powder to be added to the polybutene resin varies according to the desired specific resistance for the resultant resin, and ordinarily an amount in the range of from 20 to 80% by weight, preferably from 30 to 60% by weight of the polybutene resin is selected.

The mixing and dispersion of the carbon powder into the polybutene resin are carried out simultaneously with the addition of the additives or independently of the addition, by means of a Banbury mixer, extruder, or other ordinary mixing devices. Sometimes, the softening point of the electrically conductive polybutene resin may be elevated as compared with that of the same resin before the dispersion of the electrically conductive powder. For compensating this elevation, it is particularly advantageous that a polybutene resin having a somewhat lower softening point is used for the production of the polybutene resin for the electrolytic deposition member, or the polybutene resin used for producing the insulating member is further added with an acid-resistant, electrically nonconductive powdery substance such as silica or clay.

From the viewpoint of electric conductivity, reinforcing effect, and economy, it is preferable that the planar metal member, which is preferably made in the form of metal wire net or perforated metal plate, is made of copper or aluminum.

The method through which the mother blank is integrally formed by the use of the above-described materials may be varied in a considerably wide range. That is, the mother blank may be formed in a manner such that the electrically conductive polybutene resin is first formed into a sheet through an ordinary press-forming procedure or the like, a planar metal member of the above-described structure is interposed between two sheets of the polybutene resin, the entire of the thus interposed member and the sheets are then subjected to press-forming, thereby obtaining a laminar electrolytic deposition member, a frame body 3 beforehand shaped out of an electrically nonconductive polybutene resin is fitted around the periphery of the laminar electrolytic deposition member, and the entire assembly is thereafter melted by heating in a pressurized metal mold into an integral mother blank.

Alternatively, the laminar deposition member of the above-described structure is placed in a metal mold of a size somewhat larger than the deposition member, electrically nonconductive polybutene resin in the form of pellets or the like is laid into the gap between the metal mold and the periphery of the deposition member, and the entire contents of the metal mold is melt-molded by heating under pressure.

In still another example for producing the mother blank, a hollow frame-like body made of a polybutene resin film (electrically conductive or nonconductive) and having a configuration conforming to the top peripheral configuration of the electrolytic deposition member (the diameter of which body will be necessarily larger than the highest thereof) is placed in a metal mold, particles of electrically conductive polybutene resin are first placed within the frame-like body, then a planar metal member and again electrically conductive polybutene resin particles are placed thereon, and electrically nonconductive polybutene resin particles are placed outside of the frame-like body in the metal mold. The metal mold is then closed by, for instance, a male mold, and the entire contents of the metal mold are melt-molded by heating under pressure.

In order to obtain an integral structure of the mother blank according to the present invention, any method and apparatus can be utilized wherein the polybutene resin can be heated to a temperature at which it is possible to melt said resin under pressure in the final formation step.

The mother blank according to the present invention is adapted for reclaiming. When a mother blank mechanically damaged is maintained at a temperature higher than 150° C, the polybutene resin therein is softened and separated from the metal plate or the metal wire net. The polybutene resin thus separated is recovered, added with an electrically conductive powder, if required, for adjusting the conductivity, and passed through a forming press to obtain an electrically conductive polybutene resin. Such a procedure may be repeated as many times as desired.

According to the present invention, a polybutene resin which is highly advantageous for producing an electrically conductive member and an insulating member is utilized, and by integrally combining the components simultaneously, a mother blank having a long operational life, and is advantageous in the deposition and peeling of the cathode starting sheet can be obtained, which is highly valuable from an industrial viewpoint.

The present invention will now be described more in detail with reference to specific examples and a reference example, but the scope of the invention is not to be restricted in any way by these examples within the purview of the subject matter.

REFERENCE EXAMPLE

In order to find out a suitable material for constituting an electrolytic deposition member in the mother blank, various resins listed in the following table were subjected to a process rendering electrical conductivity (adding 50 parts of electrically conductive carbon XC-72 having an average particle size of about 20 m$\mu$, distributed by Cabot Co., to 100 parts of the resin), and test pieces made of the thus obtained materials were compared with respect to various properties. The results of the test are indicated in the same table.

| Resin | Class | Specific resistance ($\Omega$ cm) | Elongation (%) | Tensile strength (kg/cm$^2$) | Peelability | Chemical Resistance | Thermal exapansion |
|---|---|---|---|---|---|---|---|
| butyl rubber | A | 11.5 | 700 | 140 | X | O | O |
| neoprene | A | 9.1 | 200 | 220 | X | O | O |
| Hypalon | A | — | 75 | 230 | X | O | O |
| S B R | A | 6.4 | 600 | 254 | X | X | O |
| Polybutene-1 | B | 7 – 13.0 | 160 | 260 | O | O | O |
| cured epoxy resin | A | 400 | 1.8 | 320 | O | O | Δ |
| phenol-fulfural resin | A | 225 | 2.4 | 195 | O | O | Δ |
| unsaturated polyester | A | 212 | 4.5 | 280 | O | O | Δ |
| Polyethylene | B | 104 | 195 | 164 | O | O | O |
| Polypropylene | B | 86 | 146 | 205 | O | O | O |
| E V A | B | 33 | 460 | 85 | Δ | Δ | O |
| Polyvinyl chloride | B | 38 | 76 | 291 | Δ | O | O |

Test procedures were as follows:
 Specific resistance: measured by wheatstone bridge
  as specified in Japanese Rubber Industry -continued

| Resin | Class | Specific resistance (Ω cm) | Elongation (%) | Tensile strength (kg/cm²) | Peelability | Chemical Resistance | Thermal expansion |
|---|---|---|---|---|---|---|---|

Association SRIS-2301.

Elongation:  
Tensile strength: } in accordance with  
Peelability: } JIS K-6301

Marks indicative of peelability:
- ◎ easy
- O Possible (substantially the same with the peelability of a copper mother blank applied with a surface active agent)
- Δ difficult
- X impossible Chemical Resistance: ASTM-D-543
- O good
- Δ fair
- X poor Thermal Expansion: ASTM D-696
- O good
- Δ fair Note:  
A ...... thermosetting  
B ..... thermoplastic In view of the test results, it is apparent that the electrically conductive polybutene of this invention is superior in mechanical properties, peelability, and chemical resistance, and well adapted to the application for forming the electrolytic deposition member.

EXAMPLE 1

An electrically conductive carbon, Conductex "950", having an average particle size of approximately 22 mμ was mixed and dispersed in polybutene-1 at a rate of 50% by weight of the polybutene-1, thus providing an electrically conductive polybutene resin. Two sheets of copper wire nets in accordance with JIS No. 25 were laminated between the sheet materials at a depth of 1.5 mm respectively from the surfaces, and furthermore, two sheets of identical copper nets were disposed in the center of the laminated layers so that a laminar electrolytic deposition member having deposition surfaces of 1,000 mm × 1,000 mm on both sides was obtained. On the periphery of the laminar electrolytic deposition member, an insulating member 8 mm in width and made of polybutene-1 identical to that used in the laminated layers except that this had not been rendered conductive, was fitted. The entire assembly was then heated under pressure thereby to obtain an electrolytic mother blank of approximately 9 mm in thickness and of an integral structure. The electrically conductive portion of the mother blank thus obtained was formed by causing the aforementioned copper wire nets to project beyond the upper edge of the mother blank in a desired size and form with which an ordinary cross bar was connected, thereby permitting application of an electric current.

Forty-five mother blanks and forty-six anodes made of refine copper were arranged alternately in an electrolytic vessel, and electrolytic deposition process was carried out under ordinary conditions adapted for the production of the starting sheets as follows:

| Composition of the electrolyte: | |
|---|---|
| Free acid | 180 g/l |
| Cu | 40 g/l |
| Temperature of the electrolyte | 60° C |
| Current density | 2.1 A/dm² |
| Anode pitch | 100 mm |

Every 24 hours during the deposition process, the mother blanks were pulled up, and the thus deposited thin starting sheets were peeled off the mother blanks. After repetition of the above-described procedure for three months, no appreciable damage was observed on the mother blanks, and excellent starting sheets could be obtained continuously.

EXAMPLE 2

In an electrically conductive polybutene resin identical to that of Example 1, two sheets of copper plates of 0.5 mm thickness and having perforations of 20% in area (round perforations each having a diameter of 7.5 mm φ were arranged checkerwise) were inserted thereby to form a mother blank of a size identical to that of Example 1.

Forty-five mother blanks of the above-described structure and forty-six anodes are arranged alternately in an electrolytic vessel, and electrolysis was carried out under the conditions identical to those of Example 1. The mother blanks were pulled out of the vessel every 24 hours of the operation, and thin sheets of copper deposited on the mother blanks were peeled thereof. After three months of such usage, no appreciable damage was observed on the mother blanks, and excellent starting sheets were obtained continuously.

We claim:

1. A mother blank for producing starting sheets used in electrolytic non-ferrous metal production comprising a laminar electrolytic deposition member and a frame-like insulating member attached integrally to the periphery of the laminar electrolytic deposition member, said laminar electrolytic deposition member comprising a plurality of electrically conductive polybutene resin layers, two of the layers forming the electrolytic deposition surfaces of the said laminar electrolytic deposition member and a planar metal member interposed between the electrically conductive polybutene resin layers; said frame-like insulating member being made of an electrically non-conductive polybutene resin, each of said electrically conductive and non-conductive polybutene resins being a crystalline polybutene resin selected from the group consisting of homopolymer of butene-1, copolymers of butene-1 and an α-olefin having carbon atoms of 2 to 4 in an amount not exceeding 20% by weight of the butene-1, and a polymer mixture of polybutene-1 and polymer of an α-olefin having carbon atoms of from 2 to 4 in an amount not exceeding 20% by weight of the polybutene-1, and wherein said electrically conductive polybutene resin is a mixture of said crystalline polybutene resin and an electrically conductive powdery substance.

2. A mother blank as set forth in claim 1 wherein said electrically nonconductive polybutene resin is homopolymer of butene-1, and said electrically conductive polybutene resin is a mixture of homopolymer of butene-1 and an electrically conductive powdery substance in the range of 20 to 80% by weight of the butene-1 homopolymer.

3. A mother blank as set forth in claim 2 wherein said electrically conductive powdery substance is carbon powder.

4. A mother blank as set forth in claim 2 wherein said electrically conductive powdery substance is electrically conductive carbon powder of a particle size not exceeding 100 mμ.

5. A mother blank as set forth in claim 1 wherein said planar metal member is a sheet of metal wire net.

6. A mother blank as set forth in claim 1 wherein said planar metal member is a perforated metal plate.

7. A mother blank as set forth in claim 1 wherein said planar metal member is made of a material selected from copper and aluminum.

8. A mother blank as set forth in claim 1 wherein said laminar electrolytic deposition member further contains a reinforcing member.

9. A mother blank as set forth in claim 1 wherein said mother blank is obtained by a process including at its final stage a step of melt-forming the polybutene resins by heating under pressure.

10. A mother blank as set forth in claim 1 wherein said crystalline polybutene resin is selected from the group consisting of copolymers of butene-1 and an α-olefin having carbon atoms of from 2 to 4 in an amount not exceeding 5% by weight of the butene-1 and polymer mixtures of polybutene-1 and polymer of an α-olefin having carbon atoms of from 2 to 4 in an amount not exceeding 5% by weight of the polybutene-1.

11. A mother blank as set forth in claim 10 wherein said electrically conductive powdery sustance is electrically conductive carbon powder of a particle size not exceeding 100 mμ.

* * * * *